(12) United States Patent
Potyrailo et al.

(10) Patent No.: US 11,747,267 B2
(45) Date of Patent: Sep. 5, 2023

(54) SENSOR SYSTEM AND METHOD

(71) Applicant: General Electric Company, Schenectady, NY (US)

(72) Inventors: Radislav Alexandrovich Potyrailo, Niskayuna, NY (US); Joleyn Eileen Brewer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 521 days.

(21) Appl. No.: 16/826,248

(22) Filed: Mar. 22, 2020

(65) Prior Publication Data

US 2021/0293697 A1   Sep. 23, 2021

(51) Int. Cl.
*G01N 21/25* (2006.01)
*B82Y 15/00* (2011.01)
*B82Y 40/00* (2011.01)

(52) U.S. Cl.
CPC ............ *G01N 21/255* (2013.01); *B82Y 15/00* (2013.01); *B82Y 40/00* (2013.01)

(58) Field of Classification Search
CPC ...... B82Y 15/00; B82Y 40/00; G01N 21/783; G01N 2021/7763; G01N 21/78; G01N 2021/7773; G01N 2021/7779; G01N 21/4788; G01N 21/45; G01N 21/255; G01N 21/7743
See application file for complete search history.

(56) References Cited

U.S. PATENT DOCUMENTS

| 9,177,817 | B2 | 3/2015 | Hartley | |
|---|---|---|---|---|
| 10,190,978 | B2 | 1/2019 | Schubert | |
| 2016/0334327 | A1* | 11/2016 | Potyrailo | G02B 6/00 |

(Continued)

FOREIGN PATENT DOCUMENTS

| CN | 108585064 | 9/2018 |
|---|---|---|
| KR | 101601959 | 9/2016 |
| KR | 2018011592 | 10/2018 |

OTHER PUBLICATIONS

Xia et al., "3D Architectured Graphene/Metal Oxide Hybrids for Gas Sensors: A Review", Sensors (Basel), May 7, 2018, vol. 18, Issue: 5, pp. 1-21.

(Continued)

*Primary Examiner* — Samuel P Siefke
*Assistant Examiner* — Henry H Nguyen
(74) *Attorney, Agent, or Firm* — Fletcher Yoder, P.C.

(57) ABSTRACT

A sensor system includes a sensing element having a section of a layer assembly deposited onto a substrate. The layer assembly includes plural layers of different materials. The section of the layer assembly is configured to be etched to form plural individual pillars of the plural layers of the different materials. The individual pillars are configured to be in contact with a fluid to sense one or more analyte fluid components within the fluid. The sensing element is configured to generate a sensor signal responsive to the individual pillars being in contact with the fluid. The sensor system includes one or more processors configured to receive the sensor signal from the sensing element. The one or more processors may identify the one or more analyte fluid components within the fluid and an amount of each of the analyte fluid components within the fluid based on the sensor signal.

8 Claims, 7 Drawing Sheets

(56) References Cited

U.S. PATENT DOCUMENTS

2017/0045523 A1* 2/2017 Lee ................... G01N 33/587
2017/0113928 A1 4/2017 Goehlich

OTHER PUBLICATIONS

Zhao, Z.; Knight, M.; Kumar, S.; Eisenbraun, E. T.; Carpenter, M. A. Humidity effects on Pd/Au-based all-optical hydrogen sensors, Sens. Actuators, B 2008, 129, 726-733.

Alam, M.; Carriere, N.; Bahrami, F.; Mojahedi, M.; Aitchison, J. S. Pd-based integrated optical hydrogen sensor on a silicon-on-insulator platform, Optics letters 2013, 38, (9), 1428-1430.

Potyrailo, R. A.; Ghiradella, H.; Vertiatchikh, A ; Dovidenko, K.; Cournoyer, J. R.; Olson, E. Morpho butterfly wing scales demonstrate highly selective vapour response, Nat. Photonics 2007, 1, 123-128.

Potyrailo, R. A.; Starkey, I.; Vukusic, P.; Ghiradella, H.; vasudev, M.; Bunning, I.; Naik, R. R.; Tang, Z.; Larsen, M.; Deng, T.; Zhong, S.; Palacios, M.; Grande, J. C.; Zorn, G.; Goddard, G.; Zalubovsky, S. Discovery of the surface polarity gradient on iridescent Morpho butterfly scales reveals a mechanism of their selective vapor response, Proc. Natl. Acad. Sci. U.S.A. 2013, 110, 15567-15572.

Potyrailo, R. A.; Bonam, R. K.; Hartley, J. G.; Starkey, I. A.; Vukusic, P.; Vasudev, M.; Bunning, I.; Naik, R. R.; Tang, Z.; Palacios, M.; Larsen, M.; Le Tarte, L. A.; Grande, J. C.; Deng, T.; Zhong, S. Towards outperforming conventional sensor arrays with fabricated individual photonic vapour sensors inspired by Morpho butterflies, Nat. Commun. 2015, 6, 7959.

Potyrailo, R. A.; Morris, W. G. Multianalyte Chemical Identification and Quantitation Using a Single Radio Frequency Identification Sensor, Anal. Chem. 2007, 79, 45-51.

Potyrailo, R. A.; Morris, W. G. Wireless resonant sensor array for high-throughput screening of materials, Rev. Sci. Instrum. 2007, 78, 072214.

Bonam, R. K.; Hartley, J. G. Large area three dimensional structure fabrication using multilayer electron beam lithography, J. Vac. Sci. Technol. B 2016, 34, 06k606.

Baker, F. B.; Hubert, L. J. Measuring the power of hierarchical cluster analysis, Journal of the American Statistical Association 1975, 70, (349), 31-38.

Potyrailo, R. A. Toward high value sensing: monolayer-protected metal nanoparticles in multivariable gas and vapor sensors, Chem. Soc. Rev. 2017, 46, 5311-5346.

Xu, B.; Li, P.; Wang, D.; Zhao, C.-L.; Dai, J.; Yang, M. Hydrogen sensor based on polymer-filled hollow core fiber with Pt-loaded $WO_3/SiO_2$ coating, Sensors and Actuators B: Chemical 2017, 245, 516-523.

Butler, M. A.; Ginley, D. S. Hydrogen sensing with palladium-coated optical fibers, J. Appl. Phys. 1988, 64, (7), 3706-3712.

* cited by examiner

SENSOR SYSTEM AND METHOD

GOVERNMENT LICENSE RIGHTS

This invention was made with government support under contract DE-FE0031653 awarded by a Department of Energy and National Energy Technology Laboratory Cooperative Agreement. The government has certain rights in the invention.

FIELD

One or more embodiments are disclosed that relate to systems and methods for sensing gases with a sensor system.

BACKGROUND

Photonic sensor systems are used to provide optical and electrical detection methods of various gases. Known methods and systems involve nanofabrication of nanostructures with individual materials. For example, known photonic sensors may be three-dimensional nanostructures having layers of a single sensing material that sense one or more gases. As one example, FIG. 1 illustrates a known schematic of a nanostructure 100 formed with multiple lamella of the same single material for sensing of one or more gases. The nanostructure 100 includes periodic horizontal lamella 102 supported by a vertical ridge 104. The vertical ridge 104 provides the spacing between the lamella. The spacing is filled with a fluid, for example, air or other fluid where the detection is done. The interaction of a broad-band light (e.g., white light) with the nanostructure 100 results in reflected light 108 that is spectrally different from illumination light 106 direction toward the structure. For example, the multilayer interference and diffraction on the nanostructure causes the illumination light to spectrally change to the reflected light. The spectral differences constitute the origin of the sensor response with different gases in the fluid or different biological or chemical species in the fluid such as air or liquid interacting with different lamellas 102 of the nanostructure 100. The different interactions are pronounced in diverse reflected colors of the sensor.

Development of photonic sensors based on more than one material of the sensor structure may provide an opportunity to grow the capabilities of photonic sensor systems for detection of an expanded range stability. However, the existing fabrication methods of such photonic sensors do not allow for the formation of sensing nanostructures with composite materials compositions. Indeed, known methods involve nanofabrication of a nanostructure only with an individual material followed by additional steps of modification of the whole fabricated nanostructure as additional one or more steps after the formation of the nanostructure.

One example of a method of fabricating the nanostructure 100 is illustrated in FIG. 2. At step A, multiple layers of a dielectric material are deposited onto a wafer or substrate 110. The dielectric materials include plural layers of a lamella 202 separated from each other layer of lamella by layers of a support material 204. At step B, a first etching step is completed to form individual pillars 206A, 206B of the multiple layers, and at step C, a second etching step is completed to remove a portion of each layer of the support material 204 to open the layers of lamella for fluid interactions. At step D, the pillars 206A, 206B are coated with a metallic material or film 208, such as gold or other metal. For example, the film 208 is deposited onto each pillar so as to cover all exterior surfaces of the layers of lamella and support material. The nanostructure is annealed at an elevated temperature to break the film 208 into small islands of nanoparticles 210 that are retained on exterior surfaces of the layers of lamella and layers of the support material. The nanoparticles 210 become active centers or locations of interactions with the chemical or biological species of interest and produce different optical responses.

The different sizes of the nanoparticles and the spatial locations of the nanoparticles relative to each other provide a desired spectral response that is different based on exposure to different chemical or biological species. For example, the nanostructure 100 fabricated according to the steps illustrated in FIG. 2 may only detect a single chemical or biological species based on the interaction of light with the film 208, and the spectral changes between the illuminating light 106 and the reflected light 108 (shown in FIG. 1).

BRIEF DESCRIPTION

In one or more embodiments, a sensor system includes a sensing element having a section of a layer assembly deposited onto a substrate. The layer assembly includes plural layers of different materials. The section of the layer assembly is configured to be etched to form plural individual pillars of the plural layers of the different materials. The individual pillars are configured to be in contact with a fluid to sense one or more analyte fluid components within the fluid. The sensing element is configured to generate a sensor signal responsive to the individual pillars being in contact with the fluid. The sensor system includes one or more processors configured to receive the sensor signal from the sensing element. The one or more processors may identify the one or more analyte fluid components within the fluid and an amount of each of the one or more analyte fluid components within the fluid based on the sensor signal.

In one or more embodiments, a sensor system includes a sensing element comprising plural individual pillars of a layer assembly deposited onto a substrate. The layer assembly includes plural layers of first materials separated from each other by layers of a second material. One or more of the plural layers of the first materials has a surface area that is greater than a surface area of one of the layers of the second material. The individual pillars are configured to be in contact with a fluid to sense one or more analyte fluid components within the fluid. The sensing element is configured to generate a sensor signal responsive to the individual pillars being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

In one or more embodiments, a sensor system includes a sensing element having plural individual pillars of a layer assembly deposited onto a substrate. The layer assembly includes plural layers of first materials separated from each other by layers of a second material. Each of the plural layers of the first materials has a size that extends from a first end to a second end that is greater than a size of the layer of the second material such that the layer assembly includes a gap between each of the plural layers of the first materials. The individual pillars are configured to be in contact with a fluid to sense one or more analyte fluid components within the fluid. The sensing element is configured to generate a sensor signal responsive to the individual pillars being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

In one or more embodiments, a sensor system includes a sensing element having plural individual pillars of a layer assembly deposited onto a substrate. The layer assembly includes alternating layers of nanoparticles of first materials and open regions for interaction of the nanoparticles with a fluid. The nanoparticles of the first materials are configured to be in contact with the fluid to sense one or more analyte fluid components within the fluid. The sensing element is configured to generate a sensor signal responsive to the nanoparticles of the first materials being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

In one or more embodiments, a sensor system includes a sensing element having plural individual pillars of a layer assembly deposited onto a substrate. The layer assembly includes alternating layers of nanoparticles and open regions for interaction between the nanoparticles and a fluid. The nanoparticles are configured to be in contact with the fluid to sense one or more analyte fluid components within the fluid. The sensing element is configured to generate one or more sensor signals responsive to the nanoparticles being in contact with the fluid. are configured to receive the sensor signal from the sensing element. One or more processors are configured to receive the one or more sensor signals from the sensing element. The one or more processors may identify the one or more analyte fluid components within the fluid and an amount of each of the one or more analyte fluid components within the fluid based on the one or more sensor signals.

In one or more embodiments, a sensor system includes a sensing element having plural columns of a layer assembly deposited onto a substrate. The layer assembly includes plural alternating layers of different materials separated from each other by support layers. The alternating layers of different materials are configured to produce nanostructures that are disposed a distance away from the substrate. The support layers and the alternating layers of the different materials are configured to be in contact with a fluid to sense one or more analyte fluid components within the fluid. Each of the plural columns of the layer assembly are configured to interact with the fluid in one or more different regions of each of the plural columns. The sensing element is configured to generate a sensor signal responsive to the alternating layers of the different materials being in contact with the fluid. One or more processors are configured to receive the sensor signal from the sensing element. The one or more processors are configured to identify one or more of the one or more analyte fluid components within the fluid or an amount of each of the one or more analyte fluid components within the fluid based on the sensor signal.

DETAILED DESCRIPTION

Figure 1:
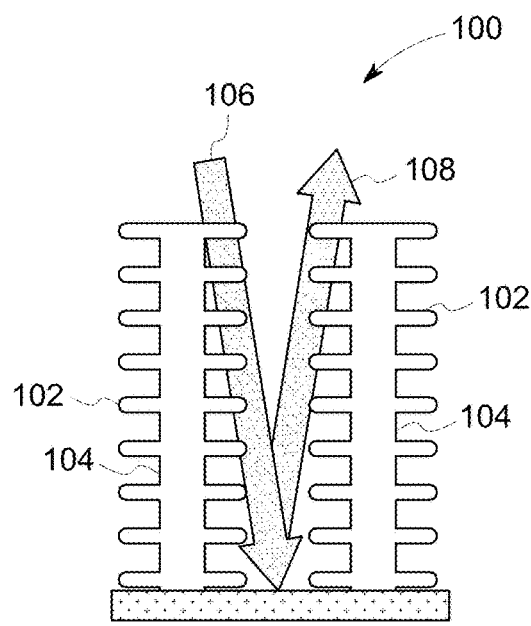
FIG. 1 illustrates a known embodiment of a nanostructure for sensing of chemical or biological species.
Figure 2:
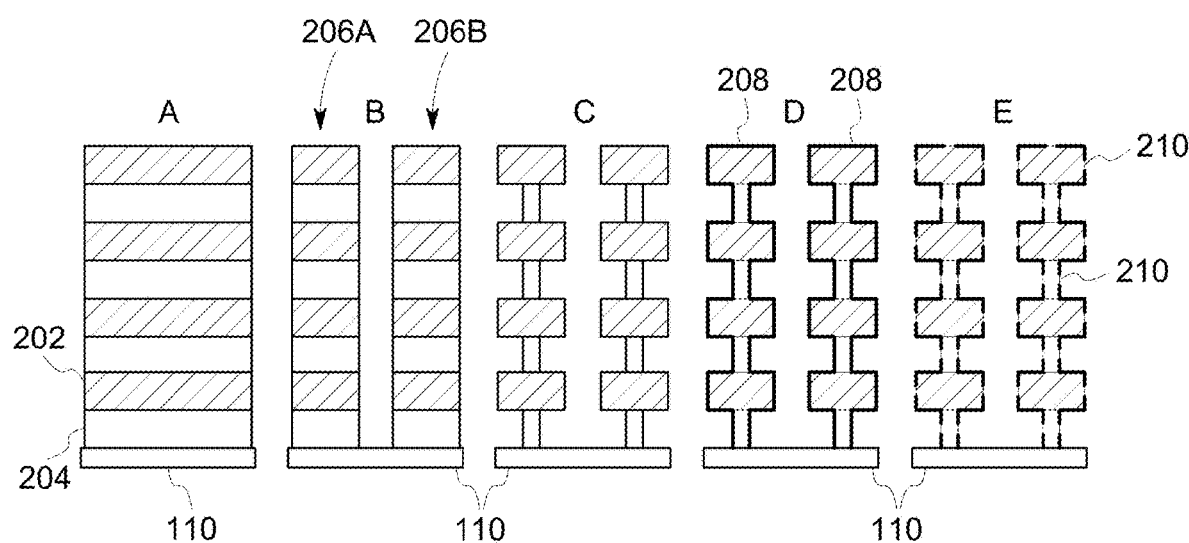
FIG. 2 illustrates a known fabrication method of a three-dimensional photonic sensor.

One or more embodiments of the inventive subject matter described herein provide for multi-analyte sensing with a sensor system that includes a sensing element. The sensing element includes a section of a layer assembly formed onto a substrate. The layer assembly includes plural layers of different materials that form individual pillars of the plural layers. The layers of different materials are contacted by a fluid to sense one or more analyte fluid components within the fluid. The layer assembly includes layers of a support material, lamella, and layers of different sensing materials. The sensing materials may be different metallic materials, metal alloys, dielectric materials, dielectric composites, or the like. The support material and lamella may be dielectric materials, composites, or the like.

One or more embodiments of the inventive subject matter described herein provide for multi-analyte sensing with a sensor system that includes a sensing element. The sensing element includes a section of a layer assembly formed onto a substrate. The layer assembly includes plural layers of the same sensing material of different thickness that form individual pillars of the plural layers. The layers of the same sensing material of different thickness are contacted by a fluid to sense one or more analyte fluid components within the fluid. The layer assembly includes layers of a support material, lamella, and layers of the same sensing material of different thickness. The sensing materials may be different metallic materials, metal alloys, dielectric materials, dielectric composites, or the like. The support material and lamella may be dielectric materials, composites, or the like.

One or more embodiments of the inventive subject matter described herein provide for multi-analyte sensing with a sensor system that includes a sensing element. The sensing element includes a section of a layer assembly formed onto a substrate. The layer assembly includes plural layers of the same sensing material in the form of nanoparticles of different size that form individual pillars of the plural layers. The layers of the same sensing material in the form of nanoparticles of different size are contacted by a fluid to sense one or more analyte fluid components within the fluid. The layer assembly includes layers of a support material, lamella, and layers of of the same sensing material in the form of nanoparticles of different size. The sensing materials may be different metallic materials, metal alloys, dielectric materials, dielectric composites, or the like. The support material and lamella may be dielectric materials, composites, or the like.

In one or more embodiments, the layer assembly may be non-selectively etched, such as by a chemical or electrical process, to remove a section of the layer assembly that results in two or more individual pillars of the layers of different materials. For example, the layer assembly may be non-selectively etched such that every layer of the layer assembly at an etching location may be removed or eliminated from the substrate and the layer assembly, resulting in voids between adjacent individual pillars. The individual pillars of the different materials may be in contact with a fluid to sense one or more analyte fluid components within the fluid.

In one or more embodiments, one or more of the individual pillars may be selectively etched to remove a portion of the one or more layers of the support material. For example, the individual pillars may be selectively etched such that only a portion of the layers of the support material may be removed from the individual pillars, and the lamella and sensing materials may not be removed from the individual pillars. Selectively etching the individual pillars leaves the plural lamella and plural layers of the different sensing materials intact and eliminates or removes at least a portion of the support materials.

In one or more embodiments, the individual pillars may include gaps between adjacent layers of the sensing materials where at least a portion of the support material has been removed or eliminated. As one example, a layer of the sensing material may have a size or extend a length in a horizontal direction that is greater than a size or length of an adjacent layer of the support material.

In one or more embodiments, the individual pillars may be manipulated to form nanoparticles of the sensing material coupled with the lamella. The nanoparticles of the sensing material may be separated from the nanoparticles of other, different sensing materials by a distance defined by the size of the remaining support layers. As one example, the individual pillars may be annealed to form the nanoparticles of the different sensing materials. As another example, the individual pillars may be selectively etched to chemically form the nanoparticles of the different sensing materials. Optionally, formation of the nanoparticles may be completed by another process. The nanoparticles may be in contact with the fluid and interact with the fluid within open regions between the nanoparticles, to sense the analyte fluid components within the fluid.

In one or more embodiments, the individual pillars may be manipulated to form nanoparticles of different size of the sensing material coupled with the lamella. As one example, the individual pillars may be annealed to form the nanoparticles of different size. As another example, the individual pillars may be selectively etched to chemically form the nanoparticles of different size. Optionally, formation of the nanoparticles of different size may be completed by another process. The nanoparticles of different size may be in contact with the fluid and interact with the fluid within open regions between the nanoparticles, to sense the analyte fluid components within the fluid.

The sensor system may include one or more processors that receive one or more sensor signals from the sensing element. The one or more processors may identify the one or more analyte fluid components within the fluid. Additionally or alternatively, the one or more processors may determine an amount of the one or more analyte fluid components within the fluid.

In one or more embodiments of the subject matter described herein provide for a sensing element having a nanostructure design that includes periodic horizontal, angled, and/or vertical regions that may provide open areas or regions. For example, the nanostructure design enables the analyzed fluid to be in contact with or interact with the horizontal, angled, and/or vertical regions of the structure. Individual elements of the sensing element having the nanostructure design may be made from the combination of sensing materials and support materials. The sensing materials may be metal or metallic alloy film materials such as, but not limited to, gold, platinum, palladium, or the like. The sensing materials for lamella and ridges may be dielectric or composite inorganic and/or organic materials. Examples of inorganic sensing materials for lamella and the ridges may be or include metal oxides, such as $SiO_2$, $TiO_2$, or the like, or metal nitrides such as SiN, TiN, TaN, or the like. Examples of organic materials for the lamella may include positive and negative photoresists such as epoxy based, polymethylmethacrylate, polyimide, polyamide, polystyrene, long chain hydrocarbons, any spin coatable polymers that may not be readily soluble in a photoresist developer solvent, or the like. Examples of organic materials for the ridge may include positive and negative photoresists such as epoxy based, polymethylmethacrylate, polyimide, polyamide, polystyrene, long chain hydrocarbons, any non-photodefinable layer that may be soluble in photoresist developer solvents, or the like. The support materials may be dielectric materials, composite materials, man-made materials, or any combination therein. The combinations of the sensing materials and the support materials may have a scale that is about two (2) to about one thousand (1000) times less than the wavelength of light for the illumination of the nanostructure. In one or more embodiments, the layer assembly of the nanostructure design may have a height that is about one (1) to about one hundred (100) times the wavelength of light for illumination of the nanostructure design of the sensing element.

At least one technical effect of the various embodiments herein include a sensor system that may accurately detect one or several different analyte fluid components within a fluid with a single type of sensing element. The single type of sensing element has a nanostructure design having plural layers of different sensing materials and different support materials. For example, the layer assembly may include two or more layers of different sensing materials that may be separated from each other and supported by various support layers made of dielectric materials, composites, or the like. Each of the different sensing materials may be in contact with the fluid sample, and may produce different sensor signals based on the different analyte components within the fluid. As one example, the different sensing materials may produce different spectral responses to illuminating light. The sensor system may accurately detect different analyte fluid components within the fluid based on the sensor responses of each of the different sensing materials of the sensing element. The fluid may be a gas-phase, for example ambient indoor or outdoor or exhaled air where such a gas sensor system detects multiple species in the gas phase such as vapors, gases, airborne chemicals, biological particles, or the like. The fluid may be a liquid-phase, for example environmental or potable water, water mist particles, such as in the air, body fluids, or other non-limiting examples where such a liquid sensor system detects multiple chemical or biological species, chemical or biological particles, or the like.

Figure 3:
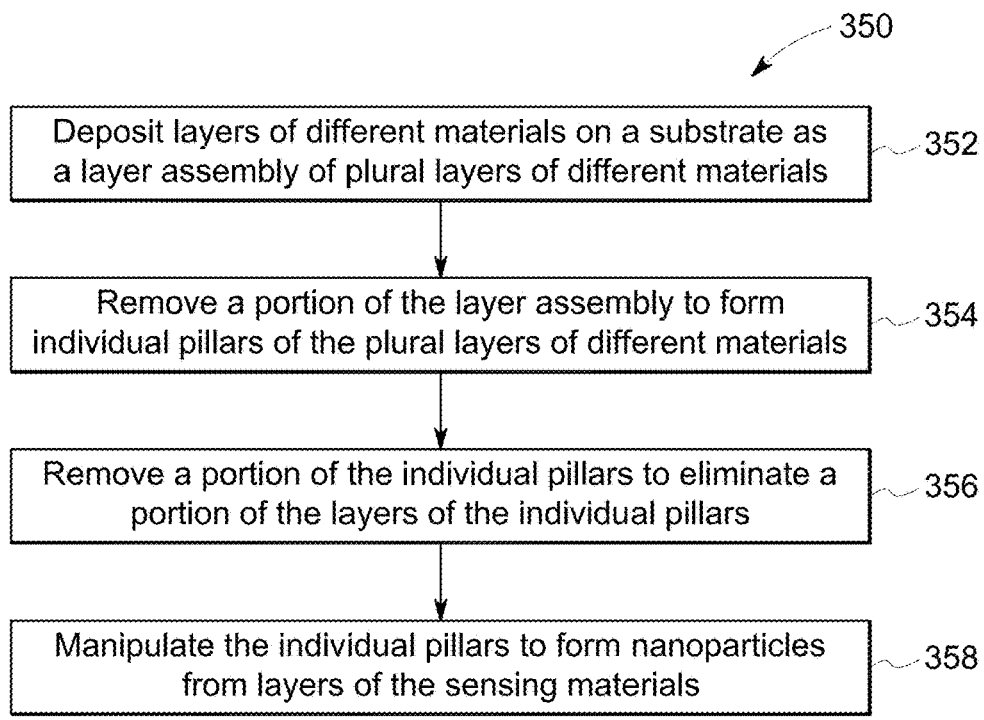
FIG. 3 illustrates a flowchart of a method of forming a sensing element of a sensor system in accordance with one embodiment.

FIG. 3 illustrates a flowchart of a method 350 of forming a sensing element 301 of a sensor system 200 in accordance with one embodiment. FIGS. 4 through 7 illustrate the steps of the method shown in FIG. 3. FIGS. 3 through 7 will be discussed together herein. The sensor system 200 includes the sensing element 301 comprising plural different layers of different materials and a control system 340. The control system 340 may include one or more microprocessors, field programmable gate arrays, and/or integrated circuits. The sensing element may generate and communicate one or more sensor signals with the control system. The sensing element may communicate the sensor signals to the control system via one or more different wired and/or wireless communication pathways between the sensing element and the control system. The one or more sensor signals may be based on different sensing materials included within the layer assembly, the fluid in contact with the layers of sensing materials of the layer assembly, a reaction of illuminating light directed toward, onto, or the like, different portions of the layers of sensing materials, or any combination therein.

Figure 4:
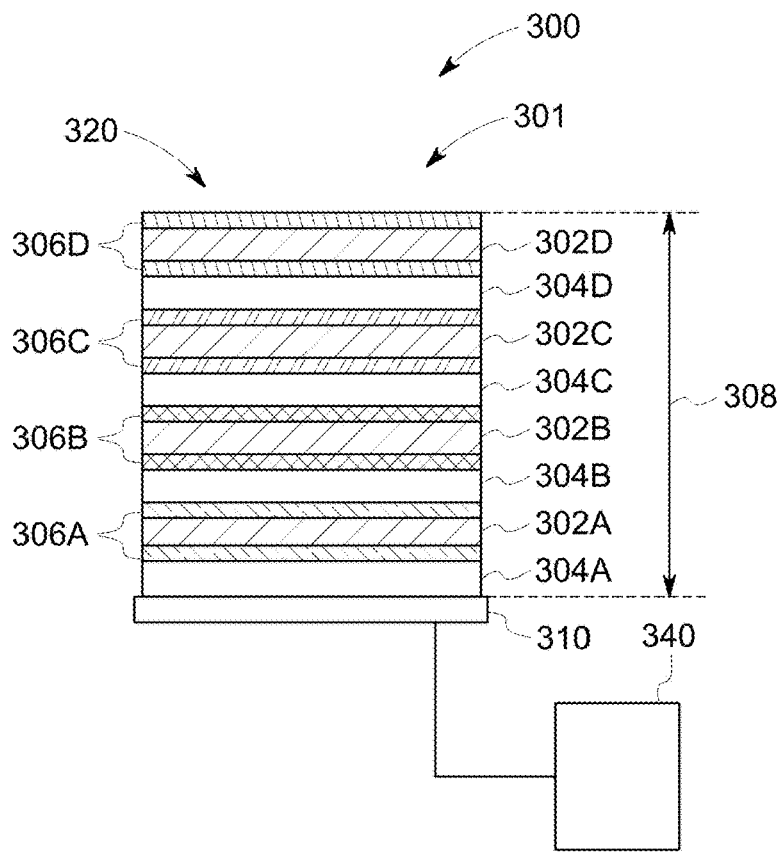
FIG. 4 illustrates a first step of fabricating a sensor system in accordance with one embodiment.

At 352 and illustrated in FIG. 4, layers of different materials are deposited on a substrate 310 as a layer assembly 320. The layer assembly 320 includes plural layers of a support layer 304, plural lamellas 302, and plural different sensing materials 306A-D disposed between adjacent support layers 304 and lamellas 302. In the illustrated embodiment of FIG. 4, the layer assembly 320 includes a first support layer 304A, a layer of a first sensing material 306A, a first lamella 302A, another layer of the first sensing material 306A, a second support layer 304B, a layer of a second sensing material 306B, a second lamella 302B, another layer of the second sensing material 306B, a third support layer 304C, a layer of a third sensing material 306C, a third lamella 302C, another layer of the third sensing material 306C, a fourth support layer 304D, a layer of a fourth sensing material 306D, a fourth lamella 302D, and another layer of the fourth sensing material 306D. Optionally, the layer assembly 320 may be formed of layers of the support material 304, lamellas 302, and the sensing materials 306A-D in any alternative order or configuration.

In the illustrated embodiment of FIG. 4, the layers of sensing materials 306A-D have a thickness that are substantially the same size. Optionally, one or more layers of the different sensing materials may have different sizes or thicknesses. In one or more embodiments, each support layer 304 may have a size or thickness that is substantially the same as or different from a size or thickness of each other support layer. In one or more embodiments each lamella 302 has a size or thickness that is substantially the same as or different from a size or thickness of each other lamella. Additionally, the layers of sensing materials 306A-D have thicknesses that are less than the thicknesses of the support layers 304 and the lamellas 302. Optionally, one or more of the layers of the sensing materials, the support layers, or the lamellas may have any alternative size, shape, or thicknesses relative to any other layer of the layer assembly 320.

The layer assembly 320 extends a distance 308 away from the substrate onto which the layer assembly 320 is deposited. The distance 308 may represent a height of the sensing element 301. In one or more embodiments, the distance 308 may be from about one to about one hundred times (1-100×) the wavelength of a light that may be illuminated onto, towards, or in the direction of the sensing element 301. Optionally, the nanostructure design of the sensing element 301 may have an alternative size.

The sensing materials 306A-D may also be referred to as first materials. The support layers 304 and/or the lamellas 302 may also be referred to herein as second materials. For example, the first materials may be one or more metallic materials, and the second materials may include dielectric materials, composites, or the like. For example, the first materials may be of a first type, and the second materials may be of a second type. Nonlimiting examples of the first materials may be metals or metallic alloys such as gold, platinum, palladium, or the like. Two or more of the sensing materials 306A-D may be the same metal or metallic material, or may have similar characteristics. Optionally, each of the different layers of sensing materials 306A-D may be unique metals or metallic alloys relative to each other layer of sensing materials. The form of the metals or metallic alloys may be a solid continuous film, nanoparticles of the metals or metallic alloys, or any combination therein.

Nonlimiting examples of the materials of the support layers 304 include silicon dioxide ($SiO_2$), silicon nitride ($Si_3N_4$), or the like. One or more of the support layers may be made up of a material that may be different than the materials of one or more other support layers. Optionally, each of the support layers 304 may be made up of the same or similar materials. Nonlimiting material examples of the lamellas include positive tone photoresist materials such as polymethyl polymethacrylate (PMMA), copolymers of methyl methacrylate (MMA), methacrylic acid (MAA), silicon dioxide ($SiO_2$), silicon nitride ($Si_3N_4$), or the like. One or more of the lamellas may be made up of a material that may be different than the materials of one or more other lamellas.

In one or more embodiments, the plural different layers of the layer assembly 320 may be in contact with a fluid that includes one or more analytes or one or more analyte components therein. Additionally or alternatively, an illumination light may be directed towards, onto, or the like, one or more portions of the layer assembly.

The sensing element may generate one or more sensor signals based on responses of the different sensing materials to the fluid and/or the illumination light. The different metallic materials of the different layers of sensing materials may sense different analyte fluid components within the fluid. For example, the layer of first sensing material 306A may sense or otherwise detect hydrogen within the fluid, and the second, third, and fourth sensing materials 306B-D may sense or otherwise detect water vapor in the fluid, or the like. Optionally, one of the plural layers of the first materials (e.g., the first sensing material 306A of the sensing materials) may sense or otherwise detect a first analyte fluid component within the fluid, and another layer of the first materials (e.g., the second sensing material 306B of the sensing materials) may sense or otherwise detect a different, second analyte fluid component within the fluid.

The sensing element may communicate the one or more sensor signals to the one or more processors of the control system 340. The one or more processors may identify the one or more analyte fluid components and/or analytes within the fluid based on the sensor signals from the sensing element. Additionally or alternatively, the one or more processors may determine an amount of the one or more analyte fluid components and/or analytes within the fluid based on the sensor signals. Optionally, the one or more processors may determine if an amount of one or more of the analyte fluid components or analytes within the fluid exceeds a predetermined threshold. For example, the amount of one analyte fluid component may be less than a minimum threshold, may be greater than a maximum threshold, or the like.

In one or more embodiments, the sensing element may include another manufacturing step. For example, at 354 and illustrated in FIG. 5, a portion of the layer assembly 320 is removed to form plural individual pillars 322A, 322B of the plural layers of the different materials. As one example, the portion of the layer assembly 320 may be removed by non-selectively chemically etching the layer assembly, by selectively chemically etching the layer assembly, by selectively and or non-selectively applying simple or blended solvents to the portion of the layer assembly 320, or the like. In the illustrated embodiment, the portion of the layer assembly extending the distance 308 is removed from the substrate 310. Optionally, a portion extending a distance shorter than distance 308 may be removed. Removing the portion of the layer assembly to form the individual pillars 322A, 322B results in a void 324 disposed between adjacent pillars. The void 324 extends a distance 326 between the adjacent pillars.

Figure 5:
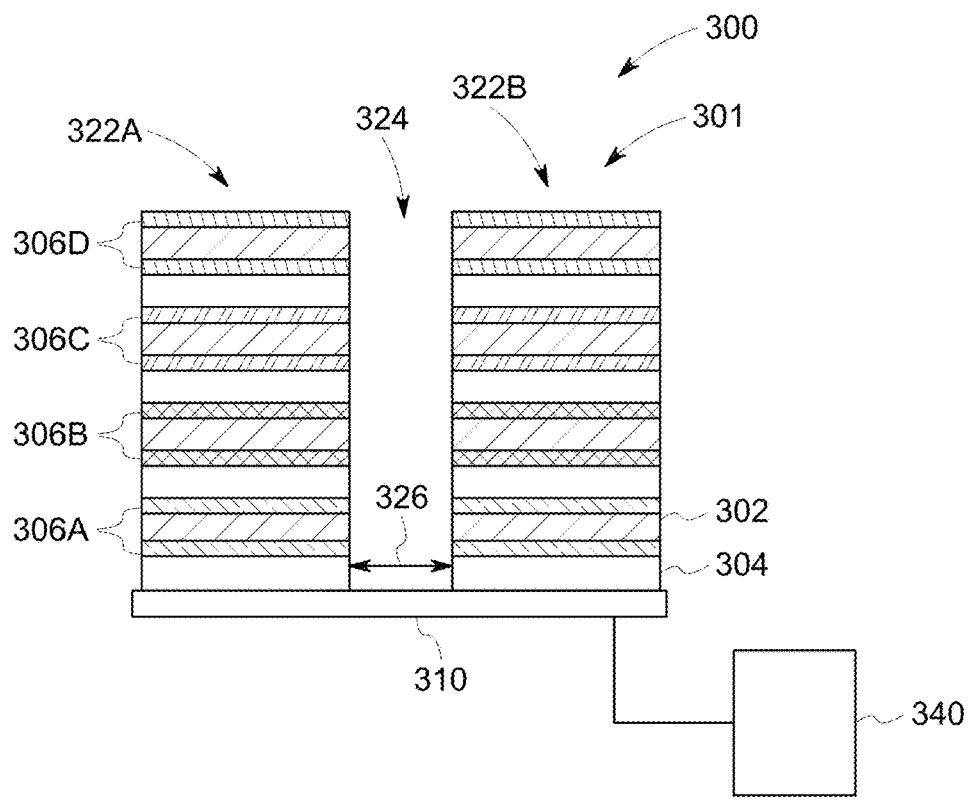
FIG. 5 illustrates a second step of fabricating a sensor system in accordance with one embodiment.

The illustrated embodiment of FIG. 5 illustrates two individual pillars, however the layer assembly may extend in two dimensions, and multiple portions of the layer assembly may be removed in one or both directions. Additionally, the voids formed by the removal of plural different portions of the layer assembly 320 may have common or different sizes. For example, a first void may extend a first distance between two adjacent pillars, and a second void may extend a different, second distance between two different adjacent pillars. Optionally, the voids along one direction may have sizes that are different or similar to the sizes of the voids along a different direction of the layer assembly.

In one or more embodiments, the plural different layers of the plural individual pillars 322A, 322B may be in contact with a fluid that includes one or more analytes or one or more analyte components therein. For example, one or more of the individual pillars may interact with the fluid in one or more different regions of the individual pillars. For example, the fluid may interact with the first and second sensing materials 306A, 306B, but may not interact with the third and fourth sensing materials 306C, 306D of the first pillar 322A. Alternatively, the fluid may interact with the third and fourth sensing materials 306C, 306D but may not interact with the first and second sensing materials 306A, 306B of the second pillar 322B. Additionally or alternatively, an illumination light may be directed towards, onto, or the like, one or more portions of the layer assembly. In one or more embodiments, the fluid and/or the illumination light may be selectively directed to a particular portion of one or more of the pillars. Optionally, the fluid and/or the illumination light may be directed toward any number of different portions of the one or more pillars.

The sensing element may generate one or more sensor signals based on responses of the different sensing materials to the fluid and/or the illumination light. The sensing element may communicate the one or more sensor signals to the one or more processors of the control system 340. The one or more processors may identify the one or more analyte fluid components and/or analytes within the fluid based on the sensor signals from the sensing element. Additionally or alternatively, the one or more processors may determine an amount of the one or more analyte fluid components and/or analytes within the fluid based on the sensor signals.

In one or more embodiments, the sensing element may include another manufacturing step. For example, at 356 and illustrated in FIG. 6, a portion of the individual pillars 322A, 322B is removed that eliminates a portion of one or more layers of the individual pillars. For example, the portion of one or more layers may be removed by a selective chemical etching process, by selectively and/or non-selectively applying a simple or blended solvent to the portion of the layers that is removed, or the like. In the illustrated embodiment of FIG. 6, a portion of each support layer 304 is removed from the individual pillars 322A, 322B. For example, the support layers 304 may be referred to as sacrificial materials of the layer assembly.

Removing a portion of each of the support layers 304 results in gaps 330 disposed between adjacent layers of sensing materials. The gaps may also be referred to as open regions for interaction between the sensing materials and the fluid. The gaps 330 extend a first distance 332 between adjacent layers of the sensing materials, and extend a second distance 334 between remaining portions of the support layers 304 and an exterior surface of the pillar. Additionally, the void 324 between a support layer of a first pillar 322A and a second support layer 322B extends a new distance 328 that is greater than the distance 326 between layers of the sensing materials and lamellas if the first and second pillars 322A, 322B.

Figure 6:
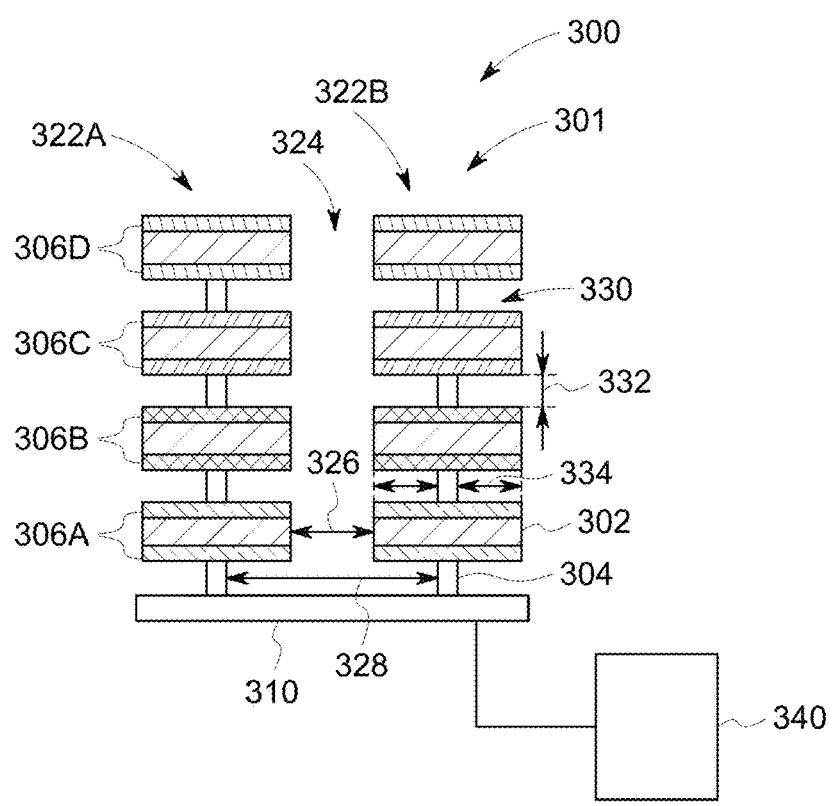
FIG. 6 illustrates a third step of fabricating the sensor system in accordance with one embodiment.
Figure 7:
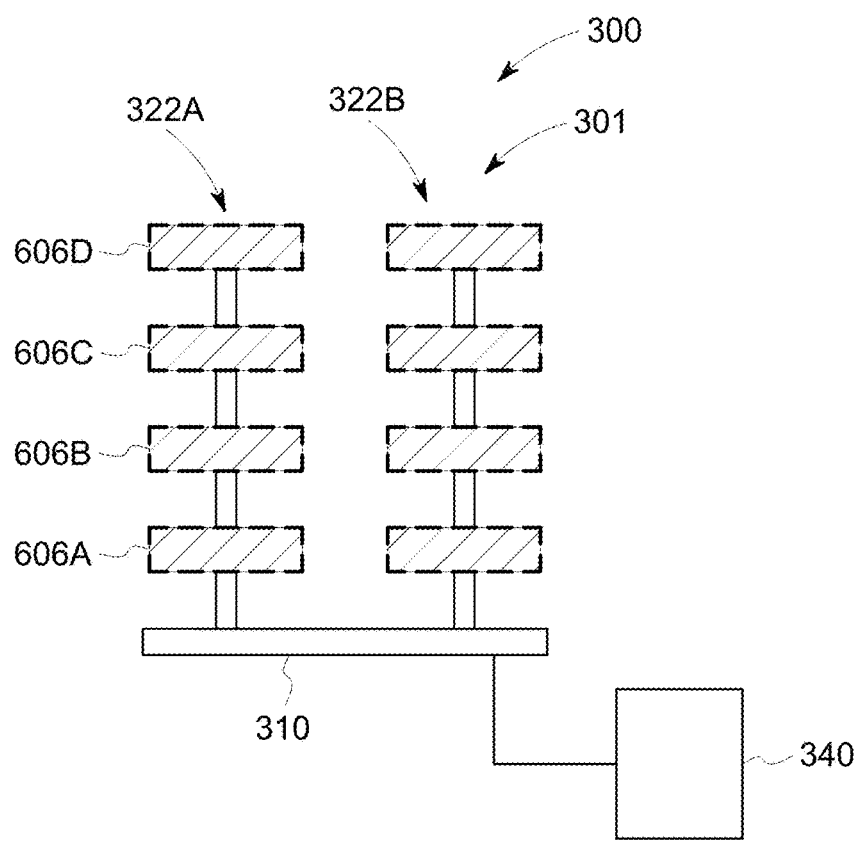
FIG. 7 illustrates a fourth step of fabricating a sensor system in accordance with one embodiment.

Additionally, removing the portion of the support layers 304 changes a surface area of the support layers 304. As illustrated in FIG. 6, the layers of the different sensing materials (e.g., the first materials) have surface areas that are greater than surface areas of the support layers (e.g., the second material). Additionally, removing the portion of the support layers increases a surface area of exposure of the layers of sensing materials. For example, a surface of the sensing materials within the gaps 330 may be exposed to the fluid, illumination light, or the like, in order to sense or detect the different analyte fluid components within the fluid.

In one or more embodiments, a fluid and/or an illumination light may be selectively or randomly directed toward one or more of the sensing materials, one or more gaps 330 formed by the removal of portions of the support layers, or the like. The sensing element may generate one or more sensor signals based on responses of the different continuous layers of the sensing materials to the fluid and/or the illumination light. The sensing element may communicate the one or more sensor signals to the one or more processors of the control system 340. The one or more processors may identify the one or more analyte fluid components and/or analytes within the fluid based on the sensor signals from the sensing element. Additionally or alternatively, the one or more processors may determine an amount of the one or more analyte fluid components and/or analytes within the fluid based on the sensor signals.

In one or more embodiments, the sensing element may include another manufacturing step. For example, at 358 and illustrated in FIG. 7, the individual pillars of the layer assembly may be manipulated to form nanoparticles of sensing materials from the layers of the sensing materials. As one example, the sensing element may be annealed at an elevated temperature to break the layers of the sensing materials into small islands of individual nanoparticles of sensing materials 606A-D. For example, the sensing element includes spatial separation between the nanoparticles of the sensing materials 606A-D coupled with the lamellas 302.

The sensing element may be annealed at temperatures that change the physical characteristics of the different sensing materials, and temperatures that do not affect or have substantially no or little affect on the different materials of the lamellas 302 and the support layers 304. In one or more embodiments, different layers of the sensing materials may be annealed at different temperatures to form nanoparticles of different sensing materials having different shapes, sizes, spaces between adjacent nanostructures, or the like. For example, the nanoparticles of the first sensing material 606A may have shapes and sizes that differ from the shapes and/or sizes of the nanoparticles of the second sensing material 606B. Optionally, the first sensing material may remain a continuous layer of metallic film (e.g., may not be broken into nanoparticles) and the second sensing material 306B may be annealed to be broken into the plural islands of the nanoparticles of the second sensing material 606B.

Like the continuous layers of the sensing materials 306A-D, the nanoparticles of the sensing materials 606A-D sense or otherwise detect different analyte fluid components within the fluid. The gaps 33 or open regions between the layers of the nanoparticles may allow the fluid to interact with the nanoparticles of the sensing materials. Additionally, the nanoparticles of each of the sensing materials 606A-D may be separated from each other by gaps formed between the nanoparticles during the formation of the nanoparticles. For example, a first nanoparticle of the sensing material 606A may be disposed a distance away from another nanoparticle of the sensing material 606A such that a gap or open space may be disposed between the two nanoparticles. The nanoparticles may interact with the fluid within the open regions formed by gaps between the nanoparticles of the sensing materials. Additionally, the sensing element may be referred to as a multi-lamella nanostructure having alternating layers of nanoparticles of first materials (e.g., nanoparticles of the sensing materials 606A-D or materials of a first type) that are separated from each other and supported by one or more of the support layers 304 (e.g., the second material or materials of a second type).

In one or more embodiments, a fluid and/or an illumination light may be selectively or randomly directed toward one or more of the nanoparticles of sensing materials, one or more gaps 330 formed by the removal of portions of the support layers, one or more of the nanoparticles of the sensing materials within the gaps, or the like. The gaps 330 may form regions of the sensing element that enables interaction between the nanoparticles of the sensing materials with the fluid. The sensing element may generate one or more sensor signals based on responses of the different continuous layers of sensing materials and/or nanoparticles of sensing materials to the fluid and/or the illumination light. The sensing element may communicate the one or more sensor signals to the one or more processors of the control system 340. The one or more processors may identify the one or more analyte fluid components and/or analytes within the fluid based on the sensor signals from the sensing element. Additionally or alternatively, the one or more processors may determine an amount of the one or more analyte fluid components and/or analytes within the fluid based on the sensor signals.

In one or more embodiments, one or more of the steps of the method 350 may be eliminated, duplicated, or skipped in one or more embodiments of forming the sensing element 301. Additionally or alternatively, the steps of the method 350 may be completed in alternative orders, one or more steps may be eliminated or skipped, one or more steps may be repeated between other steps at another time, or the like.

Figure 8:
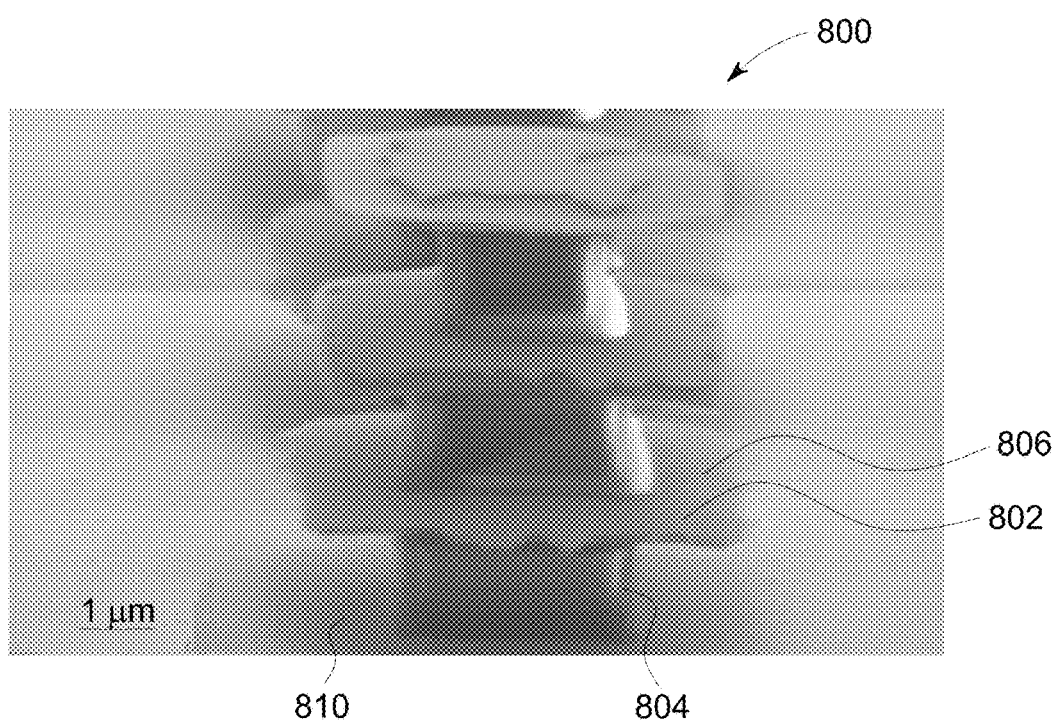
FIG. 8 illustrates a sensing element of a sensor system having a three-dimensional nanostructure in accordance with one embodiment.

FIG. 8 illustrates an example of a three-dimensional nanostructure fabricated according to the method 350 illustrated in FIG. 3. The nanostructure includes a sensing element 800 of a sensor system comprising a three-dimensional nanostructure in accordance with one embodiment. Like the sensing element 301 illustrated in FIG. 6, the sensing element 800 includes plural layers of different materials deposited onto a substrate 810 including support layers 804, and continuous layers of different sensing materials 806 coupled with lamellas 802. FIG. 8 illustrates a Scanning Electron Microscopy (SEM) image that visualizes the continuous layers of the sensing materials on the substantially horizontally extending lamellas 802. In the illustrated embodiment, the sensing materials of the sensing element were formed with substantially uniform thicknesses deposited in-situ during formation of the structured layers of the sensing element.

Figure 9:
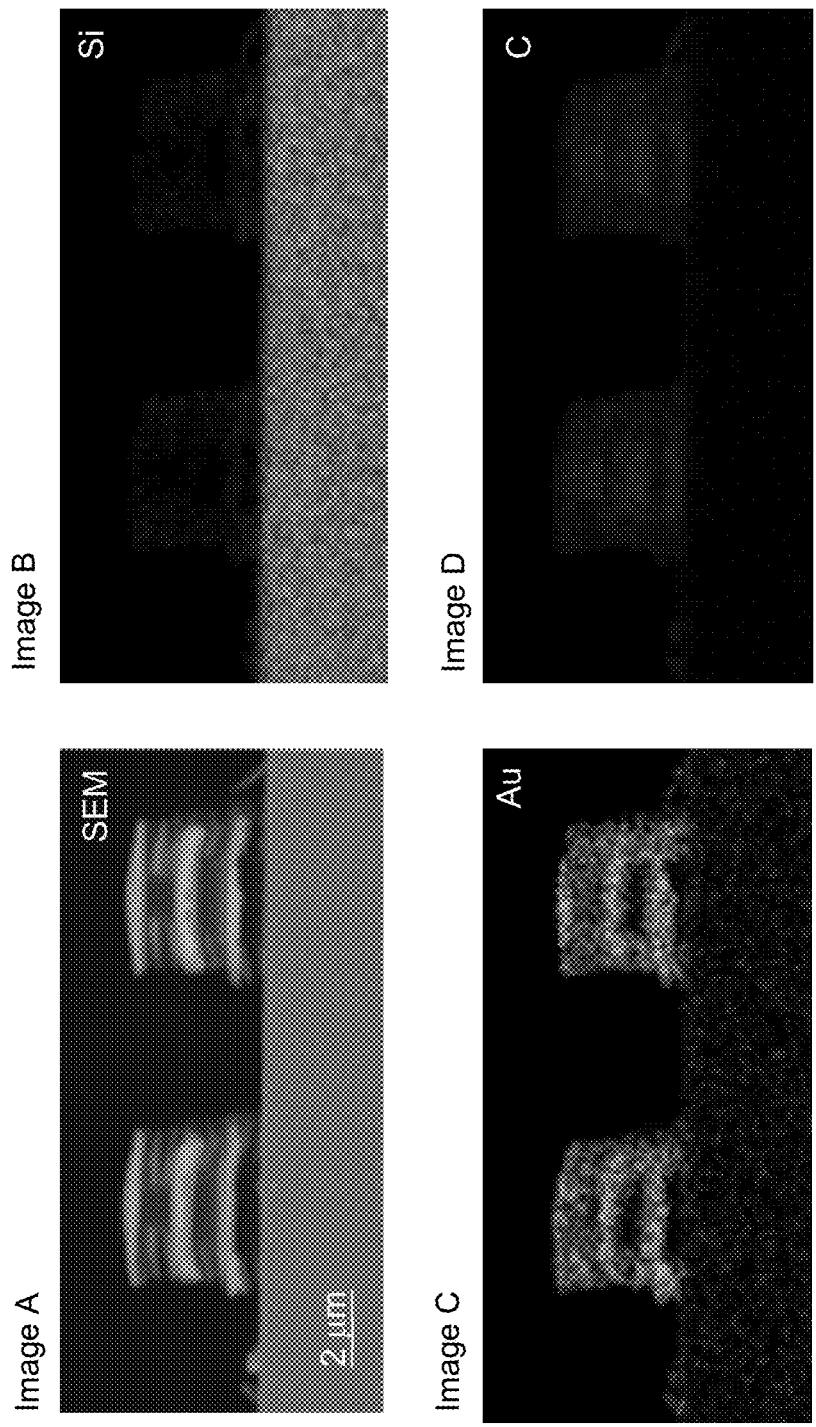
FIG. 9 illustrates images of scanning electron microscopy analysis of the sensing element shown in FIG. 8.

FIG. 9 illustrates results of one example of scanning electron microscopy (SEM) analysis performed on the sensing element 800 shown in FIG. 8. The SEM analysis was coupled with Energy Dispersive X-ray Spectroscopy (EDS) to visualize the distribution of elements within the nanostructures of the sensing elements. EDS may also be referred to as an analytical technique that may be used for the elemental analysis of diverse samples and may rely on an interaction of X-rays from an excitation source with the sample. Different types of chemical elements in the sample may have unique atomic structures that produce unique sets of peaks on its electromagnetic emission spectrum. For example, Image A illustrates the SEM image. Image B illustrates key chemical elements of the fabricated nanostructure of the sensing element such as the silicon base or substrate 810 of the sensing element. Image C illustrates that one of the sensing materials is a gold metal or gold metal alloy, and Image D illustrates that the type of material of the lamella and support layers may be carbon or made of a carbon composite.

Figure 10A:
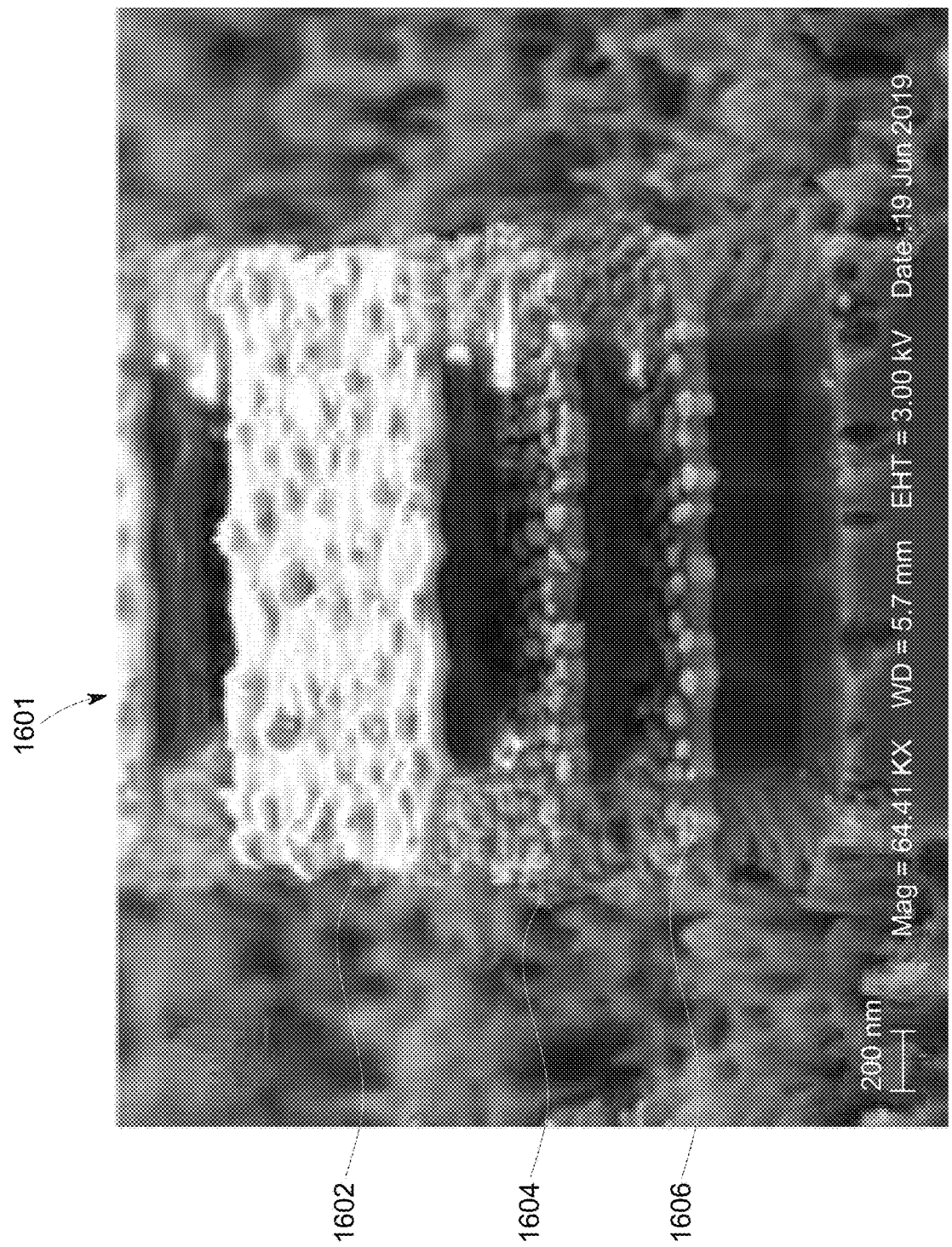
FIG. 10A illustrates an example of a single nanostructure of a sensing element of a sensor system in accordance with another embodiment.
Figure 10B:
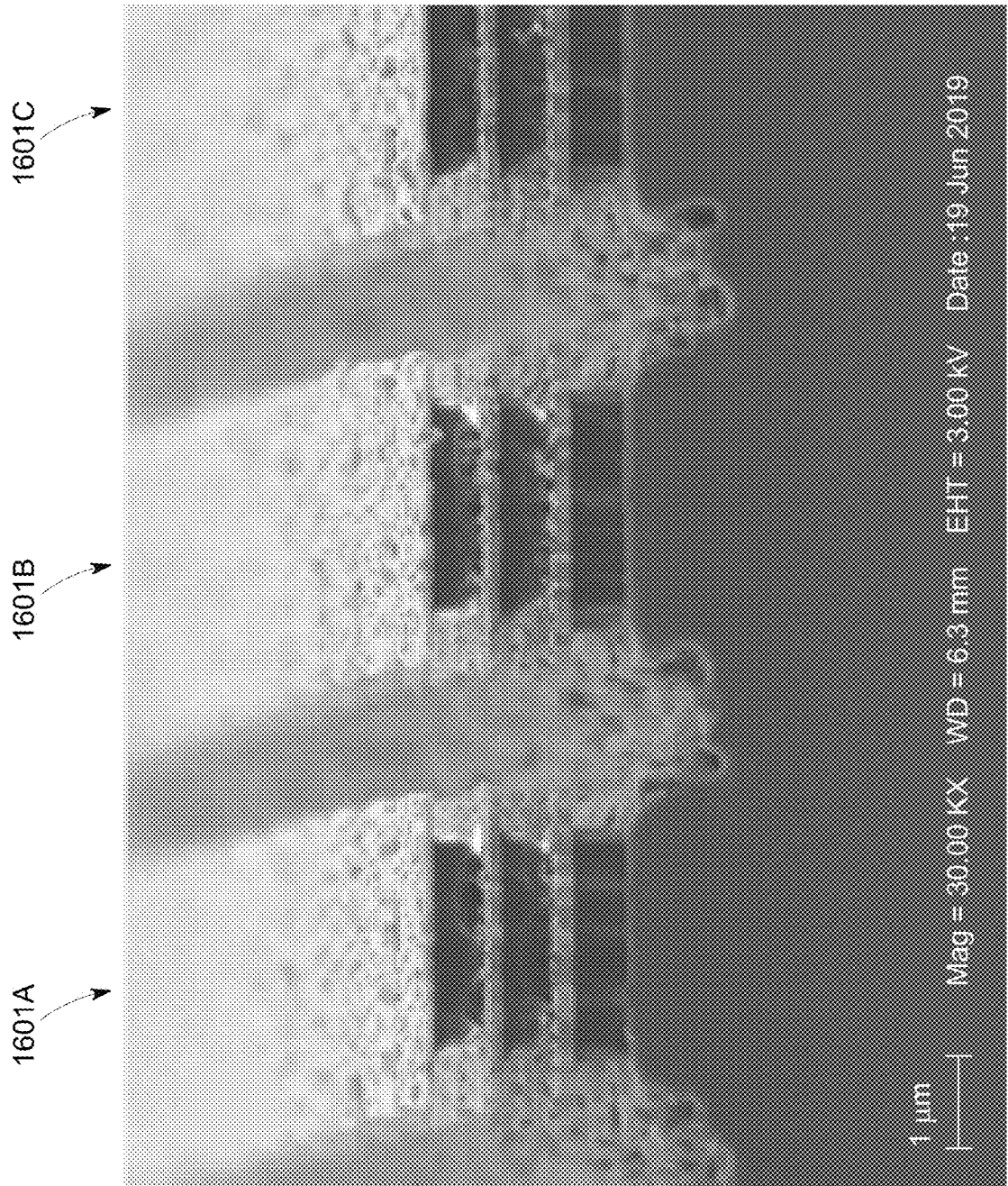
FIG. 10B illustrates an example of plural rows of nanostructures of the sensing element shown in FIG. 10A.

Fabrication of the three-dimensional nanostructures of the sensing element with in-situ functionalization may be performed according to the steps described in FIGS. 3 through 7 with the formation of nanoparticles of sensing materials of four different types of metal films. The sensing element illustrated in FIGS. 4 through 7 include four layers of different types of sensing materials, but the sensing element may include any number of layers of sensing materials. For example, FIGS. 10A and 10B illustrates an example of a three-dimensional nanostructure of a sensing element 1601 fabricated according to the present invention with in-situ functionalization. The SEM images shown in FIGS. 10A and 10B visualize the nanoparticles of three types of metal film on horizontal lamella. In the illustrated embodiment of FIGS. 10A and 10B, gold (Au) nanoparticles may be coupled with a top lamella 1602, platinum (Pt) particles may be coupled with a middle lamella 1604, and palladium (Pd) particles may be coupled with a bottom lamella 1606. FIG. 10A illustrates a single nanostructure sensing element 1601, and FIG. 10B illustrates plural rows of plural nanostructures of sensing elements 1601A, 1601B, 1601C. The plural rows of the plural nanostructures of sensing elements may be formed in a single fabrication method as described in FIGS. 4 through 7. For example, the layer assembly may extend in two or more directions, and portions of the layer assembly may be removed to form different rows and columns of plural individual pillars of layers of different materials.

In one or more embodiments of the subject matter described herein, a sensor system includes a sensing element having a section of a layer assembly deposited onto a substrate. The layer assembly includes plural layers of different materials. The section of the layer assembly is configured to be etched to form plural individual pillars of the plural layers of the different materials. The individual pillars are configured to be in contact with a fluid to sense one or more analyte fluid components within the fluid. The sensing element is configured to generate a sensor signal responsive to the individual pillars being in contact with the fluid. The sensor system includes one or more processors configured to receive the sensor signal from the sensing element. The one or more processors may identify the one or more analyte fluid components within the fluid and an amount of each of the one or more analyte fluid components within the fluid based on the sensor signal.

Optionally, each of the plural individual pillars of the plural layers of the different materials may interact with the fluid in one or more different regions of the individual pillars.

Optionally, the plural layers of the different materials include layers of first materials separated from each other by layers of a second material. The first materials include one or more metallic materials.

Optionally, the one or more metallic materials are configured to sense different analyte fluid components within the fluid.

Optionally, one of the plural layers of the first materials may sense a first analyte fluid component within the fluid, and another layer of the plural layers of the first materials may sense a second analyte fluid component within the fluid.

Optionally, the plural individual pillars are separated from each other by at least one void between two or the plural individual pillars.

Optionally, the layer assembly may include layers of first materials separated from each other by layers of a second material. One or more layers of the first materials have a first thickness that is different than a thickness of one or more layers of the second material.

In one or more embodiments of the subject matter described herein, a sensor system includes a sensing element comprising plural individual pillars of a layer assembly deposited onto a substrate. The layer assembly includes plural layers of first materials separated from each other by layers of a second material. One or more of the plural layers of the first materials has a surface area that is greater than a surface area of one of the layers of the second material. The individual pillars are configured to be in contact with a fluid to sense one or more analyte fluid components within the fluid. The sensing element is configured to generate a sensor signal responsive to the individual pillars being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

Optionally, the first materials include one or more metallic materials, and the second material is a dielectric material.

Optionally, the first materials include materials of a first type, and the second material is a material of a second type.

Optionally, a first layer of the plural layers of the first materials may sense a first analyte fluid component within the fluid, and a second layer of the plural layers of the first materials may sense a second analyte fluid component within the fluid.

In one or more embodiments of the subject matter described herein, a sensor system includes a sensing element having plural individual pillars of a layer assembly deposited onto a substrate. The layer assembly includes plural layers of first materials separated from each other by layers of a second material. Each of the plural layers of the first materials has a size that extends from a first end to a second end that is greater than a size of the layer of the second material such that the layer assembly includes a gap between each of the plural layers of the first materials. The individual pillars are configured to be in contact with a fluid to sense one or more analyte fluid components within the fluid. The sensing element is configured to generate a sensor signal responsive to the individual pillars being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

Optionally, one or more of the plural layers of the first materials has surface area that is greater than a surface area of one or more layers of the second material.

Optionally, the first materials include one or more metallic materials and the second material is a dielectric material.

Optionally, the first materials may include materials of a first type, and the second material is a material of a second type.

Optionally, one of the plural layers of the first materials may sense a first analyte fluid component within the fluid, and another layer of the plural layers of the first materials may sense a second analyte fluid component within the fluid.

In one or more embodiments of the subject matter described herein, a sensor system includes a sensing element having plural individual pillars of a layer assembly deposited onto a substrate. The layer assembly includes alternating layers of nanoparticles of first materials and open regions for interaction of the nanoparticles with a fluid. The nanoparticles of the first materials are configured to be in contact with the fluid to sense one or more analyte fluid components within the fluid. The sensing element is configured to generate a sensor signal responsive to the nanoparticles of the first materials being in contact with the fluid. One or more processors are configured to receive the sensor signal from the sensing element. The one or more processors may identify the one or more analyte fluid components within the fluid and an amount of each of the one or more analyte fluid components within the fluid based on the sensor signal.

Optionally, the layers of nanoparticles of the first materials include one or more metallic materials.

Optionally, each of the layers of nanoparticles of different materials are configured to sense different analyte fluid components within the fluid.

Optionally, each of the alternating layers of different nanoparticles of different materials are separated from each other by and coupled with one or more support layers.

Optionally, the layers of nanoparticles of different materials include different materials of a first type, and the one or more support layers include materials of a second type.

In one or more embodiments of the subject matter described herein, a sensor system includes a sensing element having plural individual pillars of a layer assembly deposited onto a substrate. The layer assembly includes alternating layers of nanoparticles and open regions for interaction between the nanoparticles and a fluid. The nanoparticles are configured to be in contact with the fluid to sense one or more analyte fluid components within the fluid. The sensing element is configured to generate one or more sensor signals responsive to the nanoparticles being in contact with the fluid. are configured to receive the sensor signal from the sensing element. One or more processors are configured to receive the one or more sensor signals from the sensing element. The one or more processors may identify the one or more analyte fluid components within the fluid and an amount of each of the one or more analyte fluid components within the fluid based on the one or more sensor signals.

Optionally, a first layer of nanoparticles of the alternating layers of nanoparticles are a first material, and a second layer of nanoparticles of the alternating layers of nanoparticles are a second material.

Optionally, the nanoparticles of the first layer of nanoparticles have a size that is different than a size of the nanoparticles of the second layer of nanoparticles.

In one or more embodiments of the subject matter described herein, a sensor system includes a sensing element having plural columns of a layer assembly deposited onto a substrate. The layer assembly includes plural alternating layers of different materials separated from each other by support layers. The alternating layers of different materials are configured to produce nanostructures that are disposed a distance away from the substrate. The support layers and the alternating layers of the different materials are configured to be in contact with a fluid to sense one or more analyte fluid components within the fluid. Each of the plural columns of the layer assembly are configured to interact with the fluid in one or more different regions of each of the plural columns. The sensing element is configured to generate a sensor signal responsive to the alternating layers of the different materials being in contact with the fluid. One or more processors are configured to receive the sensor signal from the sensing element. The one or more processors are configured to identify one or more of the one or more analyte fluid components within the fluid or an amount of each of the one or more analyte fluid components within the fluid based on the sensor signal.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" (or like terms) an element, which has a particular property or a plurality of elements with a particular property, may include additional such elements that do not have the particular property.

As used herein, terms such as "system" or "controller" may include hardware and/or software that operate(s) to perform one or more functions. For example, a system or controller may include a computer processor or other logic-based device that performs operations based on instructions stored on a tangible and non-transitory computer readable storage medium, such as a computer memory. Alternatively, a system or controller may include a hard-wired device that performs operations based on hard-wired logic of the device. The systems and controllers shown in the figures may represent the hardware that operates based on software or hardwired instructions, the software that directs hardware to perform the operations, or a combination thereof.

As used herein, terms such as "operably connected," "operatively connected," "operably coupled," "operatively coupled," "operationally contacted," "operational contact" and the like indicate that two or more components are connected in a manner that enables or allows at least one of the components to carry out a designated function. For example, when two or more components are operably connected, one or more connections (electrical and/or wireless connections) may exist that allow the components to communicate with each other, that allow one component to control another component, that allow each component to control the other component, and/or that enable at least one of the components to operate in a designated manner.

It is to be understood that the subject matter described herein is not limited in its application to the details of construction and the arrangement of elements set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system comprising:
 a sensing element comprising plural individual pillars of layer assemblies deposited onto a substrate, the plural individual pillars of layer assemblies each comprising a plurality of nanoparticle layers and open regions for interaction between nanoparticles and a fluid, wherein a first nanoparticle layer of the plurality of nanoparticle layers comprises nanoparticles of a first material configured to sense a first analyte fluid component of the fluid and a second nanoparticle layer of the plurality of nanoparticle layers comprises nanoparticles of a second material different from the first material and configured to sense a second analyte fluid component of the fluid different from the first analyte fluid component, wherein the sensing element is configured to generate two or more sensor signals responsive to one or both of the nanoparticles of the first material being in the presence of the first analyte fluid component or the nanoparticles of the second material being in the presence of the second analyte fluid component when in contact with the fluid; and one or more processors configured to receive the two or more sensor signals from the sensing element, the one or more processors configured to identify the first analyte fluid component, the second analyte fluid component, or both within the fluid, an amount of the first analyte fluid component or the second analyte fluid component within the fluid based on the two or more sensor signals, or a combination thereof.

2. The sensor system of claim 1, wherein the plural individual pillars of layer assemblies each comprise one or more support layers between two of the nanoparticle layers and the open regions, and wherein the first material and the second material include different materials of a first type, and the one or more support layers include materials of a second type.

3. The sensor system of claim 2, wherein the first material and the second material of the first type comprise one or more metallic materials, and the materials of the second type comprise a dielectric material.

4. The sensor system of claim 1, wherein a third nanoparticle layer of the plurality of nanoparticle layers comprises nanoparticles of the first material, and a fourth nanoparticle layer of the plurality of nanoparticle layers comprises nanoparticles of the second material.

5. The sensor system of claim 4, further comprising a gap disposed between the first nanoparticle layer and the second nanoparticle layer.

6. The sensor system of claim 1, wherein the nanoparticles of the first material have a size that is different than a size of the nanoparticles of the second material.

7. The sensor system of claim 1, wherein the first nanoparticle layer and the second nanoparticle layer are separated by the open regions.

8. The sensor system of claim 1, wherein the plural individual pillars are separated from each other by at least one void between two of the plural individual pillars.

* * * * *